3 Sheets—Sheet 1.
G. W. BAKER.
CRACKER MACHINE.
No. 180,697. Patented Aug. 8, 1876.
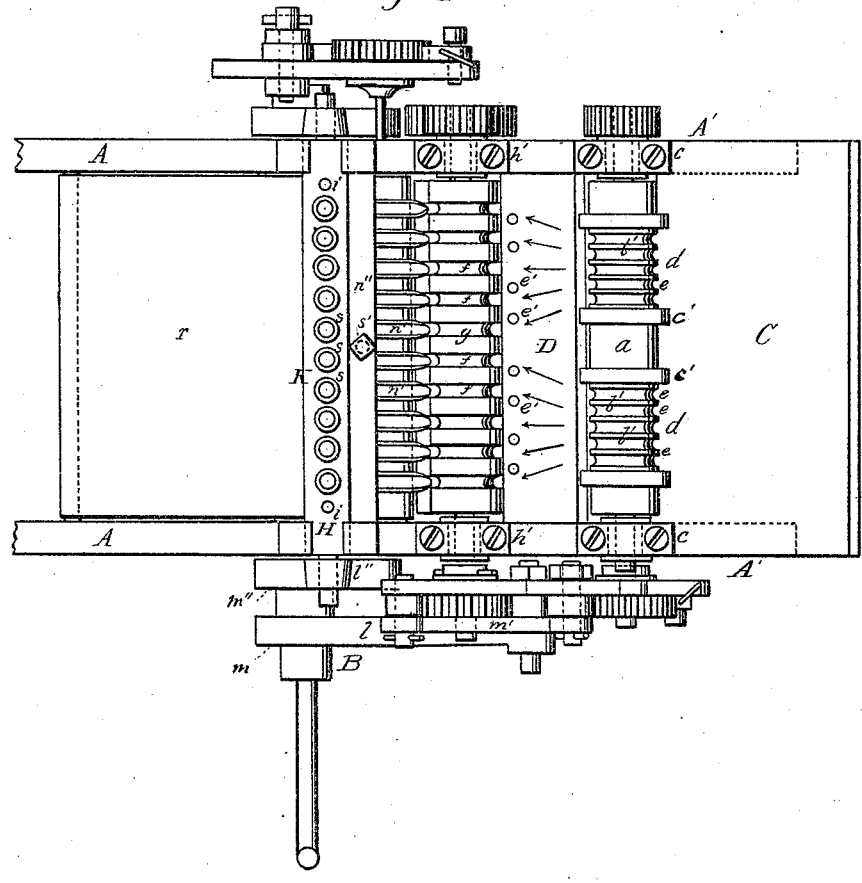
WITNESSES
Villette Anderson
Francis J. Masi
INVENTOR
George W. Baker,
E. W. Anderson
ATTORNEY.

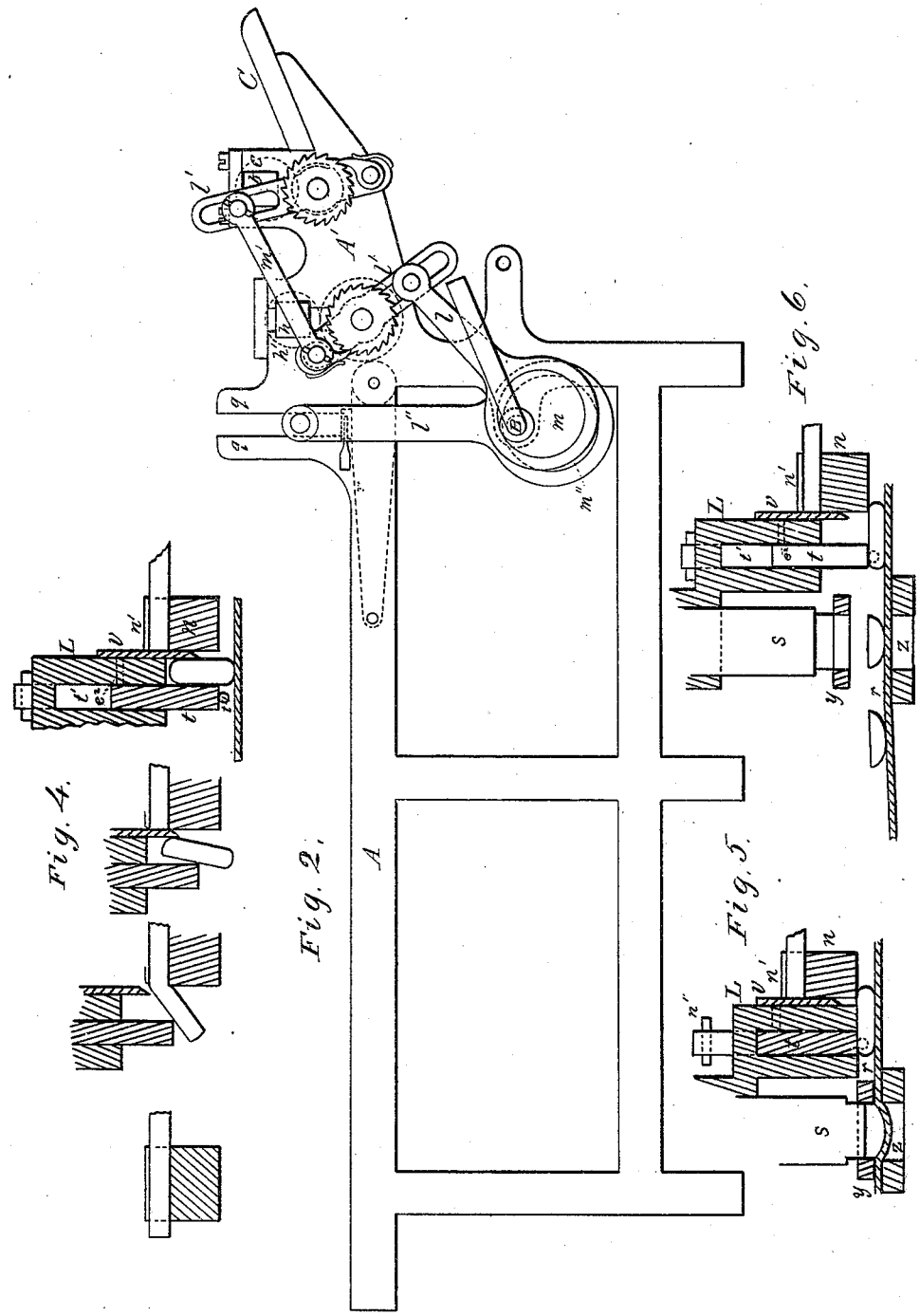

3 Sheets—Sheet 3.
G. W. BAKER.
CRACKER MACHINE.
No. 180,697. Patented Aug. 8, 1876.
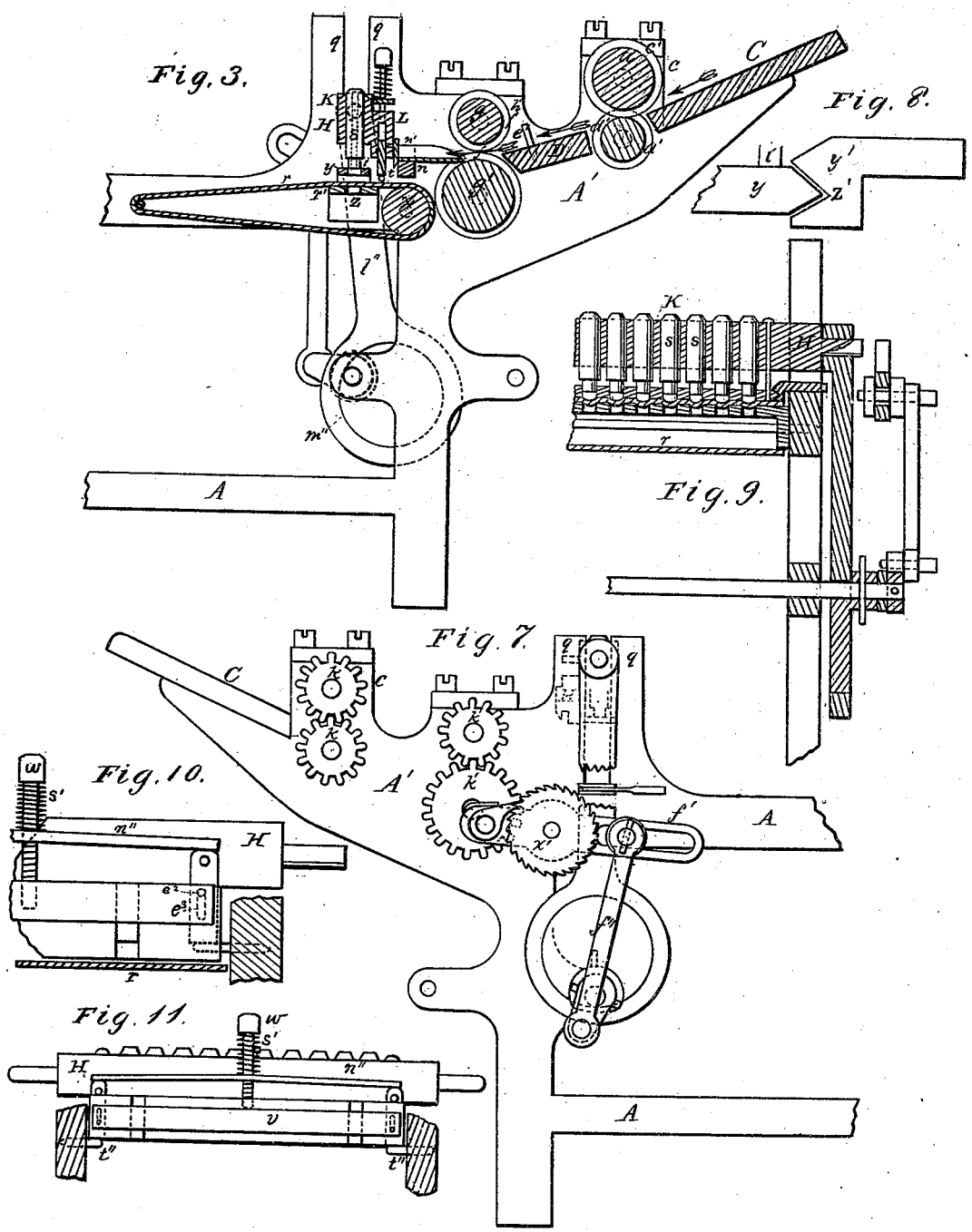
WITNESSES
Villette Anderson
Francis J. Masi
INVENTOR
George W. Baker,
E. W. Anderson,
ATTORNEY.

UNITED STATES PATENT OFFICE.

GEORGE W. BAKER, OF WILMINGTON, DELAWARE.

IMPROVEMENT IN CRACKER-MACHINES.

Specification forming part of Letters Patent No. 180,697, dated August 8, 1876; application filed March 30, 1876.

*To all whom it may concern:*

Be it known that I, GEORGE W. BAKER, of Wilmington, in the county of New Castle and State of Delaware, have invented a new and valuable Improvement in Cracker-Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my invention. Fig. 2 is a side view of the same. Fig. 3 is a vertical longitudinal section; and Figs. 4, 5, 6, 7, 8, 9, 10, and 11 are details.

This invention has relation to cracker-making machines, and is designed, mainly, to prevent the formation of scrap in the machine, which has to be worked over, and which is the cause of great waste of power.

The invention consists, first, in the construction of the cutting-rollers, each having a series of corresponding grooved sections, engaging by flanges and shoulders at the ends of each section, in a neat and perfect manner, whereby the dough is cut into strips, and delivered nearly in line with the grooves of the forwarding-rollers. Second, in the combination with the cutting-rolls, having series of sets of grooves and cutters, of the spreading-plate and pins and the forwarding-rolls. Third, in the combination, with a lower forwarding-roll, of an upper roll of comparatively small diameter and light material, to avoid undue pressure, which is apt to press the dough into the spaces between the grooves of the rollers, forming waste and clogging the machine. This squeezing of the dough between the rolls also prevents their perfect action, and the strips are not, when this takes place, properly molded. Fourth, in the combination, with the transverse strip carrying the bridges over which the strips of dough pass from the forwarding-rolls, of the knife-carrying head, whereby the said strips are first bent downward, and then cut off at the bend, and carried downward in a vertical position for pressure into circular form, and finally cleared from the receding head. Fifth, in the construction and novel arrangement of the knife about half the height of the section of dough above the bending-slide of the head, and the combination of these parts with the forcing-spring, which throws the knife and bending-slide into position for operation, and with the stops which raise the knife, and at the same time bring said slide up level with the pressure-face of the head. Sixth, in the construction and novel arrangement of the docker-frame, dockers and clearing-plate, and the stops in connection therewith, whereby said plate is brought down upon the dough in the level position, and with its lower surface even with the faces of the dockers, preventing the insertion and adhesion of the dough in the apertures of the plate; and, finally, in the combination of the parts mentioned in the formation of a cracker-machine, designed to operate without the occurrence of waste or scrap, all as hereinafter fully set forth.

In the accompanying drawings, the letter A designates the frame of the machine, whereof the sides are extended at A', to form bearings for the cutting and molding devices. B designates the main driving-shaft. On suitable inclined bearings at the extended end of the frame is located the sloping feed-board C, on which the dough or material to be worked is placed to be fed to the cutting-rollers $a\ a'$, which are journaled in boxes $b$, seated in bearings $c$ of the frame. Each of these rollers is constructed with a series of annularly-grooved spaces $d$, whereof the grooves $e$ are divided by cutters $b'$. At each end of each grooved space of the series is located on one roll a collar or flange, $c'$, which engages a shoulder, $d'$, at each end of each grooved space of the other roll. In this manner strain is taken off the cutters, and guides are formed for the edges of the dough, preventing it from entering between the ungrooved portions which separate the grooved spaces of the rollers. The dough, properly proportioned for each set of cutters, is fed between them, the number of cutters being preferably four and of grooves five to each set upon the rollers, it being found that a small number of strips can be delivered and carried forward to the advance rollers more nearly in line with the grooves of the latter than a large number.

Secured by pins passing through the sides of the frame, or otherwise, is the intermediate inclined board D, upon which the strips are led around sets of pins $e^1$, fastened in said board at right angles to its surface, and at sufficient distances apart to separate the strips and deliver them in line with the grooves $f$ of the forwarding-rollers $g$ and $g'$. In passing around these pins, which are located near the lower edge of the inclined board, close to the forwarding-rolls, the strips are somewhat turned upon their sides, so that whatever fins may be left by the action of the annular cutters will be smoothed by the board and by the pressure of the forwarding-rollers, into the grooves of which the strips are delivered from the lower end of said board after being spread and turned.

The grooves of the forwarding-rollers need not be arranged in series of sets, but may be regularly spaced, in order that the entire length of these rollers may be utilized. The lower roller $g'$ may be weighty and of sufficient diameter to carry the strips nearly on a level, and far enough forward to deliver them to the bridges which lead to the knife. The upper roll $g$ is made of wood, or other light material, and of comparatively small diameter, thereby adapting its weight to the soft dough, and preventing undue pressure on the strips passing between the rollers, which would force fins of dough between the spaces of the rollers on each side of the grooves, forming waste, which would adhere to the rollers and gradually separate them, causing poor and unfinished work. The journals of these rollers are seated in boxes $h$, which are placed in bearings $h'$ in the frame in such a manner as to have vertical play. The cutting-rollers and the forwarding-rollers are geared together in such a manner as to have equal surface movement. Sometimes it may be advisable to have the forwarding-rolls move slightly faster to draw the strips somewhat in their movement over the spreading-board. The connecting gearing of the cutters is lettered $k$ in the drawings, that of the forwarding-rolls being marked $k'$. Adjustable intermittent motion is communicated to both sets of rolls by an eccentric arm, $l$, and slotted vibrating arms $l'$, the former being engaged with an eccentric, $m$, on the driving-shaft, and the latter pivoted on the extended journals of the lower rolls, and carrying pawls, which engage with ratchet-wheels on said journals. These slotted vibrating arms are connected by a rod, $m'$, one end of which is attached by a pivot-bolt and nut to the slot of the vibrating arm of the cutter-roller, so that it can be readily adjusted to change the speed of the cutters. The end of the eccentric arm is connected to the vibrating arm of the forwarding-roller in a similar adjustable manner. The eccentric $m$ is connected by a sleeve with the eccentric $m''$, whereby the arm $l''$ of the reciprocating knife and docker-head is operated.

Transversely arranged between the sides of the frame and in front of the forwarding-rolls is the notched bridge-bar $n$, carrying the grooved fingers or bridges $n'$, which extend on a level, or nearly so, to the grooves of the lower forwarding-roll, where they approximate the grooves of the upper roll. The strips of dough, propelled forward by the rollers $g$ and $g'$, pass over the bridges, and extend over the ends thereof beyond the transverse bar $n$. The lower edge of this bar is somewhat raised above the apron $r$, upon which the cracker forms are deposited. H designates the reciprocating head, arranged transversely of the frame, and moving vertically in suitable bearings $q$, being operated by the eccentrics $m''$ and pitmen or arms $l''$ in connection therewith. The head H consists of a rectangular body, K, having a series of vertical apertures for the reception of the dockers $s$, and an angular-flanged portion, L, recessed lengthwise underneath, for the reception of the bending-slide $t$, and carrying the knife $v$, connected by arms $e^2$, passing through slots $e^3$ in the portion L to the bending-slide on the side next the rollers. The slide $t$ is of such depth that when it is pressed upward in its groove $t'$, its lower edge will be even with the lower surface of the portion L, which is thereby provided at certain times with an unbroken under surface, and serves as a presser to flatten the pieces of dough which are cut off by the knife; but when the head is raised, the slide $t$ is depressed by the action of a spring, $s'$, through a cross-head, $n''$, connected with said slide. In this depressed position the slide extends below the edge of the knife $v$ for a distance equal to about one-half the length of the feed or portion of the strip of dough cut off by the knife. In this position then it serves to bend downward the projecting ends of the strips which extend over the edge of the transverse bar from the bridges until these ends are cut off by the descent of the knife, and, being then nearly in the vertical position, fall into and are held upright in the space between the knife and slide. As the head descends, the slide $t$ engages with stops $t''$ of the frame, which prevent it from moving downward, and bring its lower edge on a level with the lower face of the remaining portions of the presser L, which, descending, flattens the pieces of dough endwise, and brings them into spread circular forms, portions of which extend under the transverse bridge-bar.

The spring $s'$ is coiled around a screw, $w$, which is connected with the presser portion L of the head, and serves to regulate the depth of the slide below the presser to correspond with the feed. When the presser recedes, the slide $t$ pushes off the circular forms of dough, and the transverse bar holds them to the apron as the head rises. Then they pass forward on the apron, and are brought over the concavities or cups $z$, and under the dockers, which, at the next descent of the head, press the flattened pieces into said cups and mold them in form ready for baking.

In this operation, the level plate $y$ descends first. This plate is connected with the head K by means of rods $i$, and should it not be exactly level when it comes in contact with the pieces of dough, they will be pressed into its apertures and adhere, clogging and impeding the work. The plate is therefore leveled in the following manner: Its ends are beveled above and below in V form, and beveled stops $y'$ are provided on the frame, and arranged to come in contact with the ends of the plate as it descends, and with the aid of the rods $i$ to bring it into the level position. At the same time the dockers $s$ descend with the head and press the crackers in form. Below its upper bevel each stop $y'$ is notched to correspond with the beveled ends of the plate, which fall into these notches $z'$ as the head descends, and are retained thereby to a certain extent as it rises, so that the plate falls with a slight shock, and clears the crackers from the ends of the dockers. After the molding is finished in this manner, the crackers are conveyed forward by the apron and deposited in a pan or other suitable receptacle.

If the upper forwarding-roll is not sufficiently sensitive, an equalizing-spring may be used in connection with it. The speed of these rollers is adjustable independently of that of the cutting-rolls, which is also separately adjustable. The cups $z$ of the apron $r$ are formed by the cloth of said apron, the apertures in the bar $r'$ allowing the cloth to be pressed down as far as required by the amount of dough in the cakes under the dockers. The apron is moved by its driving-roller $x$, the upper surface of which is level with the upper surface of the bar $r'$, in an intermittent manner, said roller having a ratchet-wheel, $x'$, which is rotated, at any requisite speed, by a pawl upon an adjustable vibrating arm, $f'$, which is operated by a pitman, $f''$, pivoted to a crank on the main shaft.

What I claim as my invention, and desire to secure by Letters Patent, is—

1. The cutting-rollers $a$ $a'$, both provided with two or more sets of series, $d$, of corresponding grooves and dividing annular cutters, grouped together, and the several sets separated by intervals $a$, and having, respectively, collars and shoulders, for engagement with each other, to guide the dough and prevent waste, substantially as specified.

2. The combination, with the lower forwarding-roll $g'$, of the upper forwarding-roll, made of light material, and of smaller diameter than the lower roll, to prevent undue pressure on the dough, substantially as specified.

3. The combination, with the cutting-rolls $a$ $a'$, having series of sets of grooves and cutters, of the spreading-plate and sets of pins, corresponding to said sets of grooves and cutters, and the forwarding-rolls $g$ $g'$, substantially as specified.

4. The combination, with the roller $x$ and bar $r'$, having their upper surfaces level, and the leveled apron supported thereby, of the transverse bridge-carrying bar $n$, raised above this level apron, and having its lower surface parallel therewith, substantially as specified.

5. The reciprocating head, having the bending-slide $t$ and the slide-knife $v$, rigidly connected together, said knife being arranged at a higher level than the bending-slide, to cut off the ends of the dough strips after bending, and to recede with the bending-slide, substantially as specified.

6. The combination, with the reciprocating head and the bending-slide $t$, moving therein, of the knife $v$, connected to said bending-slide by rigid arms $e^2$, to move therewith, and arranged with its cutting-edge above the level of the face of said slide, substantially as specified.

7. The combination, with the recessed reciprocating presser-head, of the spring-slide $t$, the knife $v$, and the frame-stops $t''$, adapted to bring the presser-face of said slide level with that of the head, and simultaneously to raise the knife above said level, substantially as specified.

8. The combination, with the reciprocating head, of the bending-slide and its connected knife, the cross-head $n''$, screw $w$, and spring $s'$, arranged about said screw, to bear on the cross-head, substantially as specified.

9. The combination, with a level plate having beveled ends, and rods connecting it to a reciprocating head, of the beveled and notched stops of the frame, adapted to bring it into the level position, and to retain it when the head rises to clear the dockers, substantially as specified.

10. The combination, with the reciprocating head, the spring $s'$, and the cross-head $n''$, of the bending-slide and the knife $v$, connected thereto and moving therewith, substantially as specified.

In testimony that I claim the above I have hereunto subscribed my name in presence of two witnesses.

GEO. W. BAKER.

Witnesses:
WALTER C. MASI,
HOWARD ZEVELY.